United States Patent
Iyer

(10) Patent No.: US 10,773,204 B2
(45) Date of Patent: Sep. 15, 2020

(54) SYSTEMS AND PROCESSES FOR REMOVAL AND REDUCTION OF $NO_x$ AND CO GASES FROM FLUE/EXHAUST GAS STREAMS

(71) Applicant: NRGTEK, Inc., Orange, CA (US)

(72) Inventor: Subramanian Iyer, Orange, CA (US)

(73) Assignee: NRGTEK, Inc., Orange, CA (US)

( * ) Notice: Subject to any disclaimer, the term of this patent is extended or adjusted under 35 U.S.C. 154(b) by 0 days.

(21) Appl. No.: 16/231,863

(22) Filed: Dec. 24, 2018

(65) Prior Publication Data

US 2020/0197857 A1    Jun. 25, 2020

(51) Int. Cl.
| | |
|---|---|
| *B01D 53/14* | (2006.01) |
| *B01D 53/62* | (2006.01) |
| *B01D 53/96* | (2006.01) |
| *B01D 53/56* | (2006.01) |
| *B01J 49/30* | (2017.01) |
| *B01J 39/09* | (2017.01) |

(52) U.S. Cl.
CPC ............. *B01D 53/14* (2013.01); *B01D 53/56* (2013.01); *B01D 53/62* (2013.01); *B01D 53/965* (2013.01); *B01J 39/09* (2017.01); *B01J 49/30* (2017.01); *B01D 2252/10* (2013.01); *B01D 2257/404* (2013.01); *B01D 2257/502* (2013.01); *B01D 2259/40096* (2013.01)

(58) Field of Classification Search
None
See application file for complete search history.

(56) References Cited

U.S. PATENT DOCUMENTS

| | | | | |
|---|---|---|---|---|
| 3,578,609 A | * | 5/1971 | Haag et al. | B01J 31/08 |
| | | | | 502/159 |
| 2007/0213415 A1 | * | 9/2007 | Sarlis | B01D 53/1456 |
| | | | | 521/27 |

FOREIGN PATENT DOCUMENTS

| | | | |
|---|---|---|---|
| CN | 102698709 | * | 10/2012 |
| JP | 2005349303 | * | 6/2004 |
| JP | 4628698 | * | 2/2011 |

* cited by examiner

*Primary Examiner* — Sheng H Davis
(74) *Attorney, Agent, or Firm* — UltimatEdge IP Law Group, P.C.; Dean G. Stathakis; Vito A. Canuso, III

(57) ABSTRACT

A system and method for the reduction of NOx and CO contaminants using an ion-exchange resin media having lower-valency ions of the transitional metal elements, such as ferrous ions, cuprous ions and/or manganese ions, such that gases containing NOx and/or CO contaminants may be passed over the media so that the contaminants are absorbed by the lower-valency ions of the transitional metal elements, the media configured so that it can be regenerated to remove the NOx and/or CO contaminants. Regeneration includes exposing the media to a heated stream of hydrogen gas or exposing the media to hydrogen ions in an electrochemical cell.

4 Claims, No Drawings

SYSTEMS AND PROCESSES FOR REMOVAL AND REDUCTION OF $NO_x$ AND CO GASES FROM FLUE/EXHAUST GAS STREAMS

BACKGROUND

The invention relates to the removal and reduction of nitrogen oxides from combustion flue gases, either from coal-fired power-plants, liquid-fuel power generation or natural gas power generation.

Coal, the primary U.S. resource for producing electricity, generates over a third of the nation's electricity. The primary gas emissions are criteria pollutants (e.g., sulfur dioxides [$SO_x$], nitrogen dioxides [$NO_x$], particulate matter, carbon monoxide and others). $NO_x$ emissions are chemical oxides that are produced during combustion at high temperatures. The two elements, nitrogen and oxygen typically do not react with each other at normal temperatures, but when high temperature combustion occurs, the elements combine to form toxic oxides.

About two thirds of all $SO_x$ and a quarter of all $NO_x$ in our atmosphere come from electric power generation, achieved by burning coal and other hydrocarbon fuels. $SO_x$ causes acid rain, while $NO_x$ creates atmospheric ozone. Secondary emissions, such as mercury, arsenic, selenium, and boron, are indigenous to the type of coal being combusted.

$NO_x$ compliance requires use of controls, such as: selective catalytic reduction (SCR), selective noncatalytic reduction (SNCR), and low $NO_x$ burners. Both SCR and SNCR cause ammonia slip, which allows un-reacted ammonia to slip past the $NO_x$ control device for subsequent removal in the electrostatic precipitator or scrubber. If the water is discharged to an ash pond, this ammonia may oxidize to nitrite and nitrate. The release of these toxins into the atmosphere is considered major contributors to air pollution, and for industries and manufacturers of internal combustion engines, $NO_x$ reduction is now a necessity.

In addition to its own toxicity, $NO_x$ combines with other substances and creates smog when it is exposed to sunlight. This creates a major health hazard for people that live in affected areas. $NO_x$ penetrates into the lung tissue and can cause permanent damage to lung tissue. Children, the elderly, people with asthma and other breathing difficulties, and people that work outside are especially susceptible to the negative health effects of $NO_x$. The way to reduce that health risk is for companies to employ $NO_x$ reduction measures.

Nitrogen oxides can also combine with water to produce nitric acid. When released from the atmosphere, it can cause acid rain, and results in significant long term damage to any structure that is repeatedly exposed to it.

In 1997 the Kyoto Protocol classified $NO_x$ as a greenhouse gas, and also called for a world wide effort to reduce the amount that was being released into the atmosphere. In the United States, this is regulated by the Environmental Protection Agency (EPA). They have set $NO_x$ levels which can legally be released by companies. If the company does not comply with the regulations sanctions and significant fines can be leveled against them.

Many industrial and utility operations are using a selective catalytic reduction (SCR) method for removing nitrogen oxides from the atmosphere. SCR uses an ammonia- or urea-based reductant that combines with the NOx and is absorbed by a catalyst. Carbon dioxide ($CO_2$) is a reaction product when urea is used as the reductant. Once the NOx is absorbed by the catalyst, a chemical reaction takes place to separate the nitrogen and oxygen. The result is that instead of $NO_x$, these operations are now releasing nitrogen, oxygen or water into the atmosphere, all of which are harmless.

The chemical equations for a stoichiometric reaction, using either anhydrous or aqueous ammonia for a selective catalytic reduction (SCR) process is:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

Some undesirable secondary reactions are:

$$2SO_2+O_2 \rightarrow 2SO_3$$

$$2NH_3+SO_3+H_2O \rightarrow (NH_4)_2SO_4$$

$$NH_3+SO_3+H_2O \rightarrow NH_3HSO_4$$

The reaction for urea, when used instead of either anhydrous or aqueous ammonia is:

$$4NO+2(NH_2)_2CO+O_2 \rightarrow 4N_2+4H_2O+2CO_2$$

The ideal reaction has an optimal temperature range between 630 and 720 K, but can operate from 500 to 720 K with longer residence times. The minimum effective temperature depends on the various fuels, gas constituents, and catalyst geometry. Other possible reductants include hydrogen gas, cyanuric acid and ammonium sulfate.

SCR catalysts are manufactured from various ceramic materials used as a carrier, such as titanium oxide, and active catalytic components are usually either oxides of base metals (vanadium, molybdenum and tungsten), zeolites, or various precious metals. Each catalyst component has its own advantages and disadvantages.

Base metal catalysts, such as vanadium and tungsten, lack high thermal durability, but are less expensive and operate very well at the temperature ranges most commonly seen in industrial and utility boiler applications. Thermal durability is particularly important for automotive SCR applications that incorporate the use of a diesel particulate filter with forced regeneration. They also have a high catalyzing potential to oxidize SO2 into SO3, which can be extremely damaging due to its acidic properties.

Zeolite catalysts have the potential to operate at substantially higher temperature than base metal catalysts; they can withstand prolonged operation at temperatures of 900 K and transient conditions of up to 1120 K. Zeolites also have a lower potential for potentially damaging SO2 oxidation.

Iron- and copper-exchanged zeolite urea SCRs have been developed with approximately equal performance to that of vanadium-urea SCRs if the fraction of the $NO_2$ is 20% to 50% of the total $NO_x$. The two most common designs of SCR catalyst geometry used today are honeycomb and plate structures. The honeycomb form usually is an extruded ceramic applied homogeneously throughout the ceramic carrier or coated on the substrate. Like the various types of catalysts, their configuration also has advantages and disadvantages. Plate-type catalysts have lower pressure drops and are less susceptible to plugging and fouling than the honeycomb types, but plate configurations are much larger and more expensive. Honeycomb configurations are smaller than plate types, but have higher pressure drops and plug much more easily. A third type is a corrugated design, comprising only about 10% of the market in power plant applications.

The first large-scale SCR was installed by the IHI Corporation in 1978. Using modern selective catalytic reduction methods, it is now possible to remove 70 to 95% of the nitrogen oxides that are released into the environment. The amount that is removed depends on the specific SCR method used and the type of operation it is used with.

SCR systems are sensitive to contamination and plugging resulting from normal operation or abnormal events. Many SCRs are given a finite life due to known amounts of contaminants in the untreated gas. The large majority of catalyst on the market is of porous construction. This porosity is what gives the catalyst the high surface area essential for reduction of $NO_x$. However, the pores are easily plugged by a variety of compounds present in combustion/flue gas. Some examples of plugging contaminates are: fine particulate matter (PM), ammonia sulfur compounds, ammonium bisulfate (ABS), and silicon compounds. Many of these contaminants must be removed while the unit is on line, for example by soot blowers or particulate filters. The unit can also be cleaned during a turnaround or by raising the exhaust temperature. Of more concern to SCR performance is catalyst poisons, which can destroy the chemistry of the catalyst and render the SCR ineffective at $NO_x$ reduction, or cause unwanted oxidation of ammonia (forming more $NO_x$). Some of these poisons include: halogens, alkaline metals, arsenic, phosphorus, antimony, chrome, and copper.

Most SCRs require tuning to properly perform. Part of the tuning involves ensuring a proper distribution of ammonia in the gas stream and uniform gas velocity through the catalyst. Without tuning, SCRs can exhibit inefficient $NO_x$ reduction along with excessive ammonia slip, due to not utilizing the catalyst surface area effectively. Another facet of tuning involves determining the proper ammonia flow for all process conditions. Ammonia flow is in general controlled based on $NO_x$ measurements taken from the gas stream or preexisting performance curves from an engine manufacturer (in the case of gas turbines and reciprocating engines). Typically, all future operating conditions must be known beforehand to properly design and tune an SCR system. Ammonia slip is an industry term for ammonia passing through the SCR un-reacted. This occurs when ammonia is: over-injected into gas stream; temperatures are too low for ammonia to react; or the catalyst has degraded (see above). Temperature is one of the largest limitations of SCR. Gas turbines, cars, and diesel engines all have a period during a start-up where exhaust temperatures are too cool for $NO_x$ reduction to occur.

In coal-fired power stations, the same basic technology is employed for removal of $NO_x$ from the flue gas of boilers used in the power generation industry. In general, the SCR unit is located between the furnace economizer and the air heater, and the ammonia is injected into the catalyst chamber through an ammonia injection grid. As in other SCR applications, the temperature of operation is critical. Ammonia slip is also an issue with SCR technology used in power plants.

Other issues that must be considered in using SCR for $NO_x$ control in power plants are the formation of ammonium sulfate and ammonium bisulfate, due to the sulfur content of the fuel as well as the undesirable catalyst-caused formation of SO3 from the SO2 and O2 in the flue gas.

A further operational difficulty in coal-fired boilers is the binding of the catalyst by fly ash from the fuel combustion. This requires the usage of soot-blowers, sonic horns, and careful design of the ductwork and catalyst materials to avoid plugging by the fly ash. SCR catalysts have a typical operational lifetime of about 16,000-40,000 hours in coal-fired power plants, depending on the flue gas composition, and up to 80,000 hours in cleaner gas-fired power plants.

All the above processes are either energy intensive, or consume raw materials which cannot be easily regenerated.

SUMMARY OF EMBODIMENTS

In one embodiment, a system is provided for the reduction of NOx and CO contaminants, the system comprising an ion-exchange resin media comprising lower-valency ions of the transitional metal elements, the system configured so that gases containing NOx and/or CO contaminants may be passed over the media such that the contaminants are absorbed by the lower-valency ions of the transitional metal elements, the media configured so that it can be regenerated to remove the NOx and/or CO contaminants. In one embodiment, the lower-valency ions of the transitional metal elements comprise ferrous ions, cuprous ions and/or manganese ions. In one embodiment, regeneration comprises exposing the media to a heated stream of hydrogen gas. In another embodiment, regeneration comprises exposing the media to hydrogen ions in an electrochemical cell.

In one embodiment, a method is provided for reducing NOx and CO contaminants, the method comprising in one embodiment providing an ion-exchange resin media comprising lower-valency ions of the transitional metal elements, and directing gases containing NOx and/or CO contaminants over the media such that the contaminants are absorbed by the lower-valency ions of the transitional metal elements. In one embodiment, the method further comprises regenerating the media to remove the NOx and/or CO contaminants. In one embodiment, the lower-valency ions of the transitional metal elements comprise ferrous ions, cuprous ions and/or manganese ions. In one embodiment, regenerating comprises exposing the media to a heated stream of hydrogen gases. In another embodiment, regenerating comprises exposing the media to hydrogen ions in an electrochemical cell.

DESCRIPTION OF CERTAIN EMBODIMENTS

The object of the present invention is a more effective and less expensive process for removing $NO_x$ from combustion flue gases. In one application, an embodiment of the present invention is preferably positioned downstream of the particulate removal systems and flue gas desulfurization systems.

The ferrous ion, as well as the cuprous ion and ions of some transition metal elements, show a propensity for absorbing gas molecules like NO and CO, both of which are present in flue gas to various levels. Thus, aqueous solutions of ferrous sulfate, ferrous perchlorate, ferrous chloride and ferrous sulfate-ethylenediamine tetraacetic acid ($FeSO_4$-EDTA) have shown significant absorption of nitric oxide (NO), ranging from 15-25 mg NO absorbed per milliliter (ml) of a unimolar (1M) solution, due to the activity of the $Fe^{++}$ ions for NO absorption. However, the use of aqueous solutions of these slats is not always favorable for various emission-control applications.

One embodiment of the present invention comprises a solid-state media, wherein lower-valency ions of transitional metal elements (such as ferrous, cuprous or manganese ions, for example) have been absorbed in an ionic form. The solid-state media can be comprised of a cation-exchange resin (CEX), wherein the ferrous ion ($Fe^{++}$) (for example) has been absorbed onto the resin by exchange with the existing $Na^+$ or $H^+$ ions, generally available as the commercial form of the cation exchange resin (CEX-$Na^+$ or CEX-$H^+$). Thus, exposure of the $Na^+$ or $H^+$ form of the cation exchange resin to a ferrous sulfate or ferrous chloride solution (for example) results in a cation exchange resin with the $Fe^{++}$ ion (for example) (CEX-$Fe^{++}$).

Ion exchange resins are available widely and cheaply in industry, and are commonly used for water treatment applications, as well many other applications where ions need to be sequestered or exchanged. Common cation exchange resins are made up of insoluble organic polymers having either sulfonic acid groups ($RSO_3^-$) or carbocyclic acid groups ($RCO_2^-$), resulting in a negative charge on the resin. Cation exchange resins can be strongly acidic or weakly acidic ($RSO_3^-$ or $RCO_2^-$), respectively. The $Fe^{++}$ form of the strongly acidic cation exchange resin would be $Fe^{++}(RSO_3^-)_2$. Other cation exchange resins include chelating resins (made from iminodiacetic acid, thiourea, etc.). In one example, an embodiment includes an $Fe^{++}$ form of a cation exchange resin as a solid-state media through which the flue gas is passed as a filter system, and the NO component of the flue gas is preferentially absorbed by the solid-state media.

Advantages of the proposed process include the complete absorption of the nitrogen oxides in the $Fe^{++}$ form of the cation exchange resin, (CEX-$Fe^{++}$), their substantially complete, if not totally complete, passage through the filtration/separation system, and the substantially complete, if not totally complete, reduction of the nitrogen oxides in the flue gas, without use of expensive catalysts and catalyst support structures commonly used in SCR systems. Embodiments of the invention need not use ammonia injection or urea injection as the $NO_x$ reductant; hence there are no ammonia slip problems or production of other ammonium salts.

Some embodiments of the present invention include a process for removal of various contaminants from a gaseous mixture, like CO and NO, either alone or together, by a $Fe^{++}$ form of a cation exchange resin (herein after referred to as CEX-$Fe^{++}$) filtration device, either at low or high pressures. After absorption of NO, the resultant molecule becomes CEX-$Fe^{++}$NO or CEX-$Fe^{++}$CO. Once the resin is saturated with NO or CO, a new replacement filter can be used for continued absorption of these exhaust gas components.

Recognizing the regeneration of the solid-state media is desirably from an energy efficiency standpoint, the spent media can be obtained in its original CEX-$Fe^{++}$ by exposing the saturated CEX-$Fe^{++}$NO to a stream of heated hydrogen gas in a separate regeneration step. The absorbed NO gets converted to nitrogen and water vapor. A suitable temperature of the incoming hydrogen stream for resin regeneration is 85-95° C., close enough to the vaporization temperature of water to enable a stream of nitrogen and water vapor. Likewise, regeneration of the media containing CO can also be obtained by exposing the media to a heated hydrogen stream, where the CO gets converted to carbon and water vapor, where the carbon can be washed away.

Some embodiments of the present invention comprise a process for the removal of various contaminants like nitric oxide or carbon monoxide from a gaseous mixture, either alone or together, by a cation exchange resin containing the ferrous ion, either at low or high pressures, followed by regeneration of the resin to its original state, CEX-$Fe^{++}$, by exposure of the NO/CO saturated solid-state media to a heated stream of hydrogen.

An additional process for regeneration of the CEC-Fe++ solid-state media from its CEX-$Fe^{++}$NO or CEX-$Fe^{++}$CO form after absorption of CO or NO would be an electrochemical reduction of the absorbed gas species by hydrogen ions in an electrochemical cell, wherein the anode and cathode compartments are separated by an ion exchange membrane, preferably a cationic membrane like Nafion™. The cathode compartment of the cell contains the saturated from of the CEX-$Fe^{++}$NO, and water is passed through the anode compartment. The water is electrolyzed to oxygen at the anode, and hydrogen ions pass through the membrane to the cathode compartment, wherein they reduce the absorbed NO to nitrogen and water. The solid-state media gets regenerated to its original form of CEX-$Fe^{++}$, and can be used again for removal of nitric oxide or carbon monoxide from exhaust or flue gas streams.

The table below shows various experiments for NO absorption and media regeneration done by a stream of heated hydrogen.

TABLE 1

NO Absorption and Regeneration
Resin used: Seimens water strongly acidic CEX, $Na^+$ form.
Exchanged with 1M FeSO4 solution to convert to $Fe^{++}$ form

| Test # | Initial NO capacity, mgNO/gm resin | Time for absorption (minutes) | Hydrogen regeneration temperature | NO capacity after regen, mgNO/gm resin |
|---|---|---|---|---|
| 1 | 21.70 | 60 | 85° C. | 20.69 |
| 2 | 29.39 | 60 | 85° C. | 30.22 |
| 3 | 28.22 | 60 | 85° C. | 27.45 |
| 4 | 29.42 | 60 | 85° C. | 30.28 |

NO stream: 80% purity at room temperature.

What is claimed is:

1. A method of reducing NOx and CO contaminants, the method comprising:
   providing an ion-exchange resin media comprising lower-valency ions of the transitional metal elements,
   directing gases containing NOx and/or CO contaminants over the media such that the contaminants are absorbed by the lower-valency ions of the transitional metal elements, and
   regenerating the media to remove the NOx and/or CO contaminants, wherein regenerating comprises exposing the media to a heated stream of hydrogen gases.

2. The method of claim 1, where the lower-valency ions of the transitional metal elements comprise ferrous ions, cuprous ions and/or manganese ions.

3. A method of reducing NOx and CO contaminants, the method comprising:
   providing an ion-exchange resin media comprising lower-valency ions of the transitional metal elements,
   directing gases containing NOx and/or CO contaminants over the media such that the contaminants are absorbed by the lower-valency ions of the transitional metal elements, and
   regenerating the media to remove the NOx and/or CO contaminants, wherein regenerating comprises exposing the media to hydrogen ions in an electrochemical cell.

4. The method of claim 3, where the lower-valency ions of the transitional metal elements comprise ferrous ions, cuprous ions and/or manganese ions.

* * * * *